United States Patent
Jung

(10) Patent No.: US 9,158,313 B2
(45) Date of Patent: Oct. 13, 2015

(54) SYSTEM AND METHOD FOR SUPERVISED THERMAL MANAGEMENT

(75) Inventor: Hwisung Jung, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 524 days.

(21) Appl. No.: 13/557,412

(22) Filed: Jul. 25, 2012

(65) Prior Publication Data

US 2014/0032010 A1    Jan. 30, 2014

(51) Int. Cl.
*G06F 15/18*     (2006.01)
*G05D 23/19*     (2006.01)
*G06F 1/20*      (2006.01)
*G06F 1/32*      (2006.01)

(52) U.S. Cl.
CPC ............ *G05D 23/1917* (2013.01); *G06F 1/206* (2013.01); *G06F 1/324* (2013.01); *G06F 1/3206* (2013.01); *G06F 1/3296* (2013.01); *Y02B 60/1217* (2013.01); *Y02B 60/1285* (2013.01)

(58) Field of Classification Search
USPC ............................................. 706/12, 45, 62
See application file for complete search history.

(56) References Cited

U.S. PATENT DOCUMENTS

| | | | |
|---|---|---|---|
| 6,207,936 B1* | 3/2001 | de Waard et al. | 219/497 |
| 2007/0244676 A1* | 10/2007 | Shang et al. | 703/2 |
| 2013/0263611 A1* | 10/2013 | Kearney et al. | 62/56 |
| 2014/0303804 A1* | 10/2014 | Priel et al. | 700/299 |

* cited by examiner

*Primary Examiner* — David Vincent
(74) *Attorney, Agent, or Firm* — Sterne, Kessler, Goldstein & Fox PLLC

(57) ABSTRACT

System and method for incrementally varying input levels and recording respective output temperatures at the varied levels, storing, in a training table, first correlations between the varied levels of the input parameter and defined temperature ranges, detecting an input parameter level during operation and re-recording the output temperature at the detected level, generating a second correlation between the detected level and a second temperature range, determining whether the second temperature range is different from a first temperature range from among the defined temperature ranges, the first temperature range correlating to the level of the input parameter corresponding to the detected level, updating the training table when the second temperature range is different from the first temperature range, predicting an expected temperature range, and dynamically scaling, based on the expected temperature range, the detected level of the input parameter to control the output temperature in real-time.

20 Claims, 8 Drawing Sheets

| | Operating Temperature Ranges |
|---|---|
| T0 | 85°C to 90°C |
| T1 | 91°C to 95°C |
| T2 | 96°C to 100°C |
| T3 | 101°C to 105°C |
| T4 | 106°C to 110°C |
| T5 | 111°C to 115°C |
| T6 | 116°C to 120°C |
| T7 | 121°C to 125°C |

350

| Row Number | Input Features | | | Output Feature |
|---|---|---|---|---|
| | Voltage | Frequency | Utilization | Operating Temperature |
| 1 | Low | Low | Low | T0 |
| 2 | Low | Low | Medium | T0 |
| 3 | Low | Low | High | T1 |
| 4 | Low | Medium | Low | T1 |
| 5 | Low | Medium | Medium | T2 |
| 6 | Low | Medium | High | T2 |
| 7 | Low | High | Low | T1 |
| 8 | Low | High | Medium | T2 |
| 9 | Low | High | High | T3 |
| 10 | Medium | Low | Low | T2 |
| 11 | Medium | Low | Medium | T3 |
| 12 | Medium | Low | High | T3 |
| 13 | Medium | Medium | Low | T4 |
| 14 | Medium | Medium | Medium | T4 |
| 15 | Medium | Medium | High | T5 |
| 16 | Medium | High | Low | T4 |
| 17 | Medium | High | Medium | T5 |
| 18 | Medium | High | High | T5 |
| 19 | High | Low | Low | T4 |
| 20 | High | Low | Medium | T4 |
| 21 | High | Low | High | T6 |
| 22 | High | Medium | Low | T7 |
| 23 | High | Medium | Medium | T7 |
| 24 | High | Medium | High | T6 |
| 25 | High | High | Low | T7 |
| 26 | High | High | Medium | T7 |
| 27 | High | High | High | T7 |

| Row Number | Input Features | | | Output Feature |
|---|---|---|---|---|
| | Voltage | Frequency | Utilization | Operating Temperature |
| 1 | Low | Low | Low | T0 |
| 2 | Low | Low | Medium | T0 |
| 3 | Low | Low | High | T1 |
| 4 | Low | Medium | Low | T1 |
| 5 | Low | Medium | Medium | T2 |
| 6 | Low | Medium | High | T2 |
| 7 | Low | High | Low | T1 |
| 8 | Low | High | Medium | T2 |
| 9 | Low | High | High | T3 |
| 10 | Medium | Low | Low | T2 |
| 11 | Medium | Low | Medium | T3 |
| 12 | Medium | Low | High | T3 |
| 13 | Medium | Medium | Low | T4 |
| 14 | Medium | Medium | Medium | T4 |
| 15 | Medium | Medium | High | T5 |
| 16 | Medium | High | Low | T4 |
| 17 | Medium | High | Medium | T5 |
| 18 | Medium | High | High | T5 |
| 19 | High | Low | Low | T4 |
| 20 | High | Low | Medium | T6 |
| 21 | High | Low | High | T6 |
| 22 | High | Medium | Low | T7 |
| 23 | High | Medium | Medium | T7 |
| 24 | High | Medium | High | T6 |
| 25 | High | High | Low | T7 |
| 26 | High | High | Medium | T7 |
| 27 | High | High | High | T7 |
| 28 | High | Medium | Low | T7 |

FIG. 4

SYSTEM AND METHOD FOR SUPERVISED THERMAL MANAGEMENT

BACKGROUND OF THE INVENTION

1. Field of the Invention

The present disclosure is directed to a system and a method for controlling operating temperatures of integrated circuits (ICs). In particular, the present disclosure utilizes machine learning techniques to control temperatures of the ICs.

2. Related Art

Package-on-package (POP) solutions are implemented by packaging a silicon wafer of a first integrated circuit along with (e.g., on top of) a silicon wafer of a second integrated circuit, the first integrated circuit being electrically connected to the second integrated circuit. The use of POP solutions is desirable because it eliminates the need for long electrical connections (e.g., wirebonds, traces, etc.) to electrically connect the first integrated circuit with the second integrated circuit, thereby reducing latency between the two integrated circuits. For example, an external memory circuit can be packaged on top of a baseband circuit to form a POP solution. However, conventionally, such a POP solution is undesirably designed to have a lower operating device temperature limit with respect to the operating device temperature of the individual baseband circuit. This is because, during operation, the relatively lower device temperature of the external memory circuit is adversely impacted by the relatively higher device temperature of the baseband circuit. In particular, the baseband circuit may be capable of operating at high frequencies (>2 GHz), and, therefore, the baseband circuit may generate a large amount of heat which would need to be dissipated in the POP solution. This large amount of heat may raise the device temperature of the POP solution to be greater than the relatively lower device temperature limit of the external memory circuit. This causes damage to the external memory circuit. Further, the frequent elevation of the external memory's device temperature closer to its limit contributes to accelerated aging of the external memory circuit, resulting in undesirable higher leakage currents. Thus, to minimize the above adverse effects to the external memory circuit, the baseband circuit is designed to function at an operating frequency which is lower than the operating frequency at which the baseband circuit is capable of operating. This prevents the baseband circuit from generating the large amount of heat that adversely impacts the external memory circuit. However, even though the above adverse effects to the external memory circuit are minimized, the limiting of the operating frequency of the baseband circuit to control the device temperature of the POP solution is undesirable because it reduces the overall performance of the POP solution.

Also, other conventional techniques employed to control the device temperatures of the individual integrated circuits in POP solutions are not optimum. For example, one conventional technique is a reactive technique (as opposed to predictive) and relies on thermal throttling to control the device temperature. In this reactive technique, a processor is allowed to run at full capacity. However, when a measured operating temperature of the processor exceeds a given thermal limit, the running capacity of the processor is reactively curtailed to reduce the operating device temperature of the same. This reactive technique is not optimum because it degrades the performance of the processor and provides a limited time period to prevent a thermal runaway condition. Further, this reactive correction requires a throttling system that requires significant and periodic calibrations.

Another known temperature control technique requires determining a highest performance condition of the processor based on an application profile information of a given application, and reactively re-configuring the processor for thermal safety when the highest performance condition is observed. Again, this technique is not optimum because it is specific to an application, and must be duplicated for every application before being executed on the processor. Further, implementation of this technique during operation can be very complex (due to the involved mathematics) depending upon the various processes required to be run by each application.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the invention.

FIG. 3 illustrates an exemplary original training table for a given IC block according to an embodiment of the present disclosure;

FIG. 4 illustrates an updated training table according to an embodiment of the present disclosure;

DETAILED DESCRIPTION OF THE INVENTION

In the following description, numerous specific details are set forth in order to provide a thorough understanding of the disclosure. However, it will be apparent to those skilled in the art that the disclosure including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As discussed above, conventional techniques used to control device temperatures of integrated circuits included in POP solutions are not optimum. Generally, the conventional techniques are reactive. In contrast, the present disclosure is directed to various techniques that are predictive in nature and involve "machine learning" processes which deriving of self-improving decision-making strategies during operation. For example, as discussed in detail below, the predictive system and method proposed in the present disclosure enable (i) monitoring thermal conditions of all integrated circuit (IC) blocks, (ii) predicting future operating temperatures of the IC blocks based on the monitored thermal conditions, and (iii) dynamically scaling input parameters (for example, operating voltage and/or operating frequency and/or utilization) of the IC blocks based on the predicted future temperatures to control the operating temperature in real-time.

Figure 1:
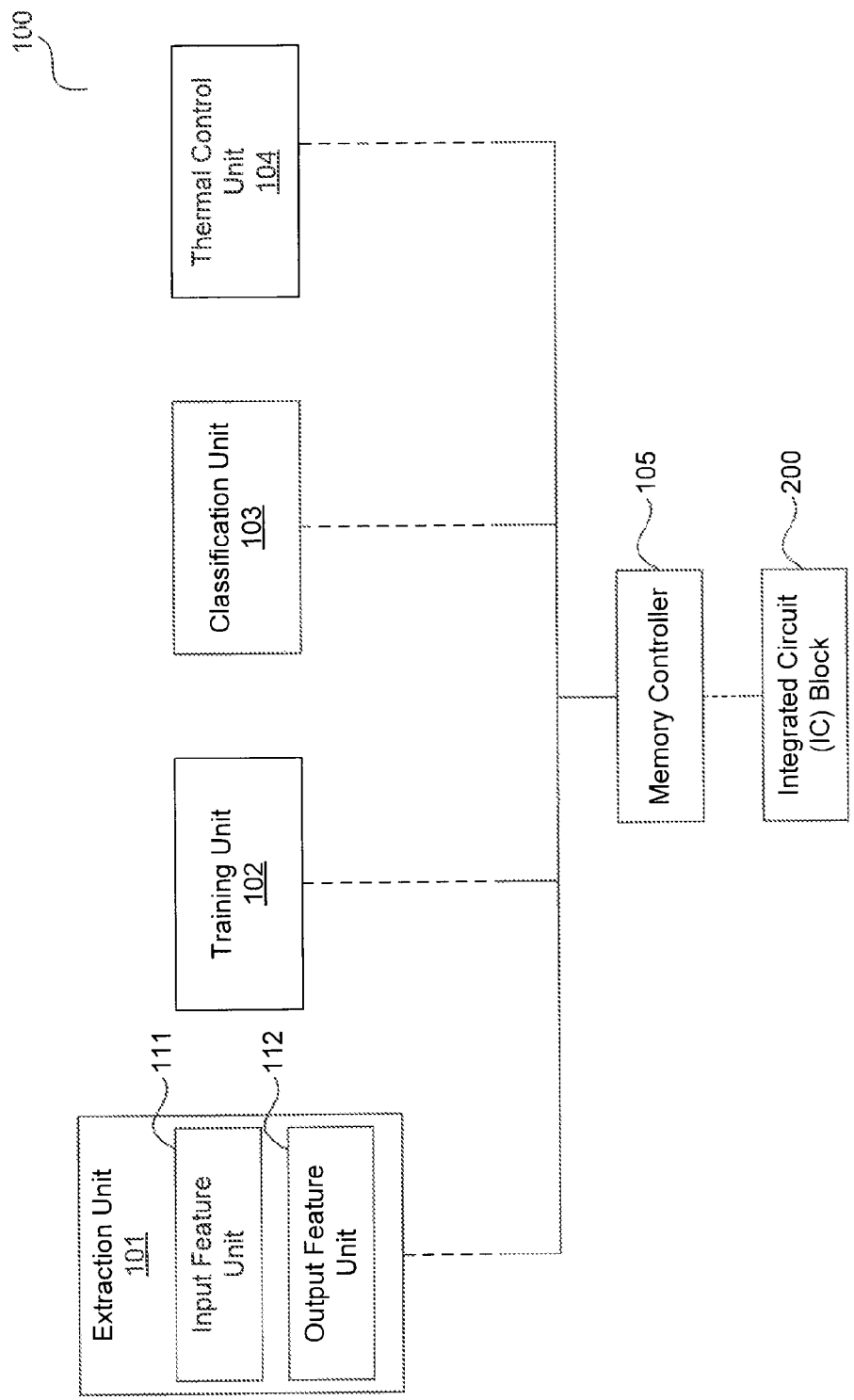
FIG. 1 illustrates a block diagram of an exemplary predictive system for implementation according to an embodiment of the present disclosure.

FIG. 1 illustrates a block diagram of an exemplary predictive system 100 according to an embodiment of the present disclosure. The predictive system 100 can be implemented using software components, hardware components, or a combination of software and hardware components. The predictive system 100 includes a memory controller 105 coupled to an extraction unit 101, a training unit 102, a classification unit 103, and a thermal control unit 104. The extraction unit 101 includes an input feature unit 111 and an output feature unit 112. As discussed below, the predictive system 100 controls operating temperatures of IC blocks included in integrated circuits.

Figure 2:
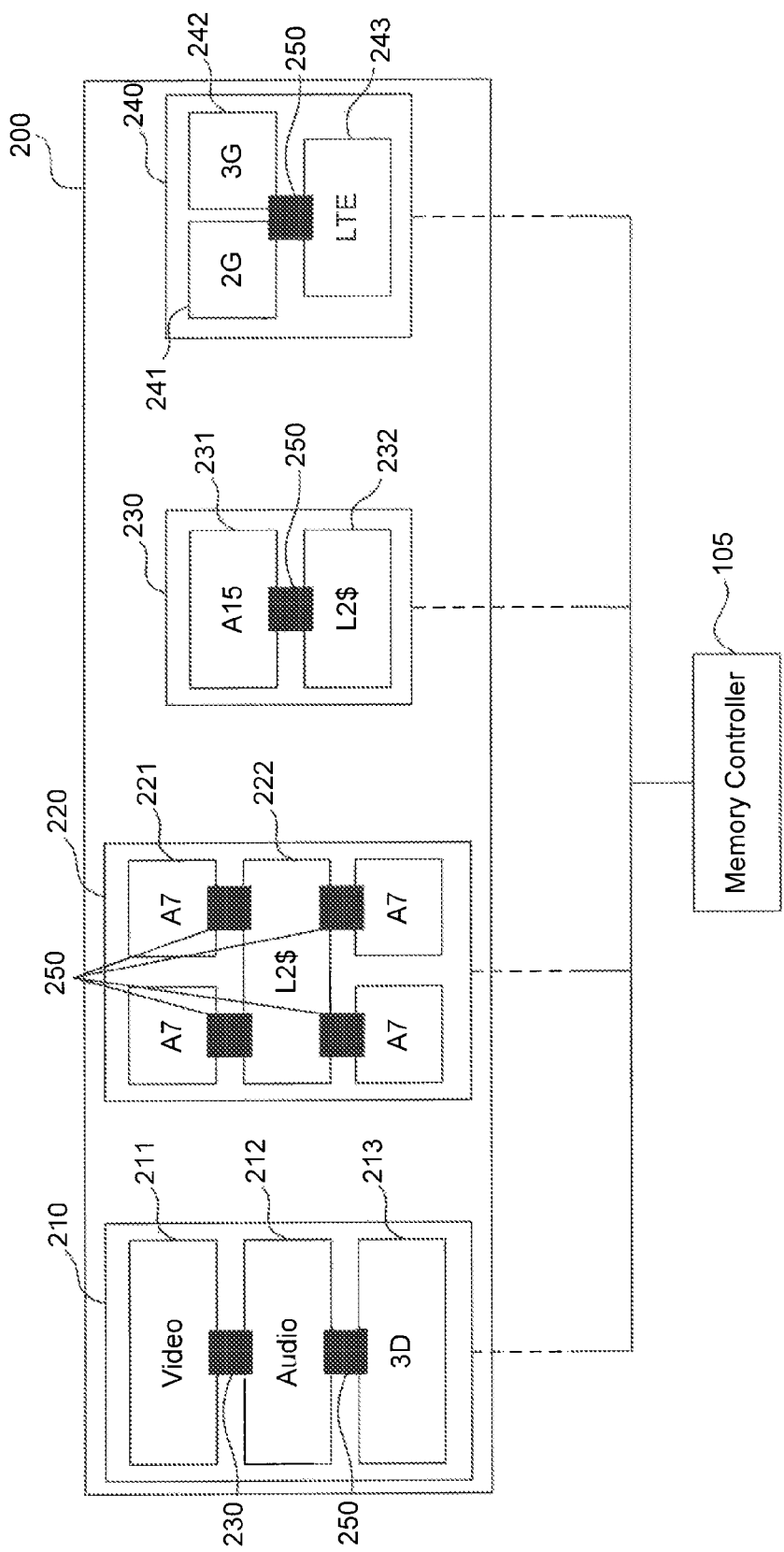
FIG. 2 illustrates exemplary IC blocks of an integrated circuit packaged according to an embodiment of the present disclosure.

FIG. 2 illustrates exemplary IC blocks of an integrated circuit 200 according to an embodiment of the present disclosure. The exemplary IC blocks include a multimedia block 210, a first processor block 220, a second processor block 230, and a modem block 240. Each exemplary IC block 210, 220, 230, 240 is coupled to the memory controller 105. The multimedia block 210 further includes a video block 211, an audio block 212, and a 3D display block 213. The first processor block 220 further includes arm cluster blocks (A7) 221 and an L2 cache cluster block (L2$) 222. The second processor block 230 further includes an arm cluster block (A15) 231 and an L2 cache cluster block (L2$) 232. The modem block 240 includes a 2G cluster block 241, a 3G cluster block 242, and a Long Term Evolution (LTE) cluster block 243. Further, each of the exemplary IC blocks 210, 220, 230, 240 includes strategically placed temperature sensors 250. The strategic placement of the sensors 250 enables the output feature unit 112 to accurately measure the operating temperatures of the relevant components of the IC blocks 210, 220, 230, and 240.

I. Monitoring Thermal Conditions

In one embodiment, the monitoring the thermal conditions includes (a) generating an original training table for every IC block to baseline a correlation between input features and output features (defined below) before an application is executed, and (b) updating the original training table, during and after an application is executed, for every relevant IC block that is involved in running the application. The generating the original training table before an application is executed will now be discussed.

Before an Application is Executed

Upon power up and before an application is executed by the memory controller 105, the output feature unit 112 enables the recording of an output feature such as, for example, an operating temperature for every IC block (e.g., memory caches, multimedia, or modem, etc.). Basically, for an IC block, an output feature is a measurable output parameter that is exhibited by the IC block under certain input operating conditions. Further, the output feature unit 112 enables the recording of the operating temperature under various levels (e.g., low, medium, high) of input features such as, for example, an operating voltage, an operating frequency, and/or a processor utilization associated with every block. In one embodiment, the output feature unit 112 enables the recording of the operating temperature under all possible combinations of levels of the various input features. Basically, for an IC block, an input feature is an input parameter or condition that controls the operation or functioning of the IC block. Herein, the operating voltage may be the input voltage at which the IC block operates, the operating frequency may be the frequency at which the IC block operates, and the processor utilization (hereinafter, "utilization") may be the measure of utilization of the memory controller 105 while supporting the functioning of the IC block under the certain input operating conditions. Now, for every IC block, the input feature unit 111 may incrementally vary various input parameters from a level of low to medium to high. These levels of low, medium, and high are relative to a full operating range of an IC block. For example, if the full operation range of an IC block is a hundred percent (100%), then the low level may be from 0-35% of the full operating range, the medium level may be from 36-70% of the full operating range, and the high level may be from 71-100% of the full operating range. Now, as the input feature unit 111 incrementally varies the various input parameters from a level of low to medium to high, the output feature unit 112 may record a respective operating temperature at the varied levels or after each incremental variation. For example, for a given IC block, the output feature unit 112 may record a first measurement of the operating temperature at low voltage, low frequency, and low utilization; a second measurement at low voltage, low frequency, and medium utilization; and so on until, for example, all possible levels of the input parameters for the given IC block have been determined. This recording of the operating temperature at various (e.g., all possible) levels of the input parameters establishes correlations between the different levels of the various input parameters and the respectively recorded operating temperatures.

The training unit 102 may monitor and facilitate the recording of the operating temperature via the output feature unit 112. Further, the training unit 102 may define operating temperatures or ranges of operating temperatures to be used in the above correlations. For example, the training unit 102 defines temperature ranges T0=85° C. to 90° C., T1=91° C. to 95° C., T2=96° C. to 100° C., T3=101° C. to 105° C., T4=106° C. to 110° C., T5=111° C. to 115° C., T6=116° C. to 120° C., T7=121° C. to 125° C. The training unit 102 may then generate, for every block, a respective original training table including the temperature ranges and the various varied levels of the input parameters. Finally, the training unit 102 may complete each original training table with respective measured operating temperature values in accordance with the above temperature ranges.

FIG. 3 illustrates an exemplary original training table 300 for a given IC block (e.g., the arm cluster block (A15) 231) according to an embodiment of the present disclosure. FIG. 3 also illustrates exemplary temperature ranges 350 according to an embodiment of the present disclosure. As seen from FIG. 3, for an IC block, the input feature unit 111 varies each input parameter to cover the various levels of the input parameters and the training unit 102 fills in the original training table 300 in accordance with the temperature ranges 350 based on the operating temperature values measured by the output feature unit 112. In one embodiment, the covering the various levels includes covering all possible levels of the input parameters. In this way, the respective original training tables are generated. In the illustrated embodiment, since three input parameters are considered, each original training table 300 includes twenty-seven (27) rows. It is to be noted that any number of input parameters, or possible levels of the input parameters, may be considered.

The updating the original training table 300 during and after an application is executed will now be discussed.

During and after an Application is Executed

The training unit 102 enables updating of the original training table 300 during and after an application is executed by the memory controller 105. In particular, when an application is executed, the input feature unit 111 detects the level (e.g., low, medium, high) of each input parameter at which every relevant block involved in running the application is operating. Then, the output feature unit 112 re-records the operating temperature of every relevant block that is involved in running the application, and reports the same to the training unit 102. Now, upon every instance of re-recording, for every relevant block, the training unit 102 determines a new correlation between the detected levels of the input parameters and a new temperature range from among the defined temperature ranges T0-T7. This new correlation is based on the operating temperature values re-recorded by the output feature unit 112. The memory controller 105 compares the new temperature range with the original temperature range corresponding to the above detected input parameter levels in the original training table 300. The memory controller 105 then instructs the training unit 102 to update the original training table 300 by adding a new row including the above new correlation when it is determined that the new operating temperature range is different from the original temperature range. In one embodiment, the training unit 102 updates the original training table 300 by adding the new row only when it is determined that the new temperature range includes temperatures that are higher than the temperatures included in the original temperature range.

FIG. 4 illustrates an updated training table 400 according to an embodiment of the present disclosure. It is to be noted that, since the various (e.g., all possible) levels of input parameters were recorded in the original training table 300 before the application was executed, the addition of the above new row creates a duplicate entry with respect to the input parameter levels. However, it is possible that the new temperature range after the application was executed may be different from the original temperature range before the application was executed. This could be caused by the difference in the environmental conditions (e.g., room temperature) under which the original training table was generated (i.e., when the output feature unit 112 recorded the operating temperature of the given block before the application was executed) and the environmental conditions (e.g., lower or higher than room temperature) under which the original training table was updated by adding the new row (i.e., when the output feature unit 112 re-recorded the operating temperature of the given block after the application was executed). Additionally, this could be caused because the application requires the given block to run at, for example, varying utilization (see e.g., FIG. 5). As discussed later on, these respective updated training tables 400 enable the classification unit 103 to predict future operating temperatures of the respective IC blocks at a future time.

For clarity, an example of the above updating of the original training table 300 to generate the updated training table 400 will now be discussed with respect to the arm cluster block (A15) 231.

For instance, let us assume that a web browsing application is executed and that the arm cluster block (A15) 231 is involved in running the web browsing application. Further, let us assume that the original training table illustrated in FIG. 3 was created for the arm cluster block (A15) 231. Now, when the input feature unit 111 detects that the web browsing application requires the arm cluster block (A15) 231 to operate at high voltage, medium frequency, and low utilization, and the output feature unit 112 re-records the operating temperature of the arm cluster block (A15) 231 to be 123° C., then the training unit 102 creates a new correlation between the detected input parameter levels of high voltage, medium frequency, and low utilization and the new temperature range T7 (because 123° C. falls within temperature range T7). The memory controller 105 then compares the new temperature range T7 with the original temperature range that correlates to high voltage, medium frequency, and low utilization in the original training table 300 of FIG. 3. Therefore, the memory controller 105 searches the original training table 300 for a row that corresponds to input parameter levels of high voltage, medium frequency, and low utilization. The memory controller 105 finds the above levels in row 22 of the original training table 300, and determines that these input parameter levels correlate to the original temperature range T6. The memory controller 105 then instructs the training unit 102 to update the original training table 300 (and thereby generate updated training table 400) by adding a new row including the above new correlation when it is determined that the new temperature range (T7) is different from the original temperature range (T6). In one embodiment, the memory controller 105 instructs the training unit 102 to update the original training table 300 by adding the new row only when it is determined that the new temperature range (T7) includes temperatures that are higher than the temperatures included in the original temperature range (T6). Therefore, the training unit 102 updates the original training table 300 by adding a new row, row 28, to create an updated training table for the arm cluster block (A15) 231. This exemplary updated training table 400 is shown in FIG. 4. As seen from FIG. 4, row 28 indicates a new correlation between the input parameter levels of high voltage, medium frequency, and low utilization and the new temperature range T3. Further, as discussed above, the addition of row 28 creates a duplicate entry with respect to the input parameter levels found in row 22 (marked with arrows for convenience).

Figure 5:
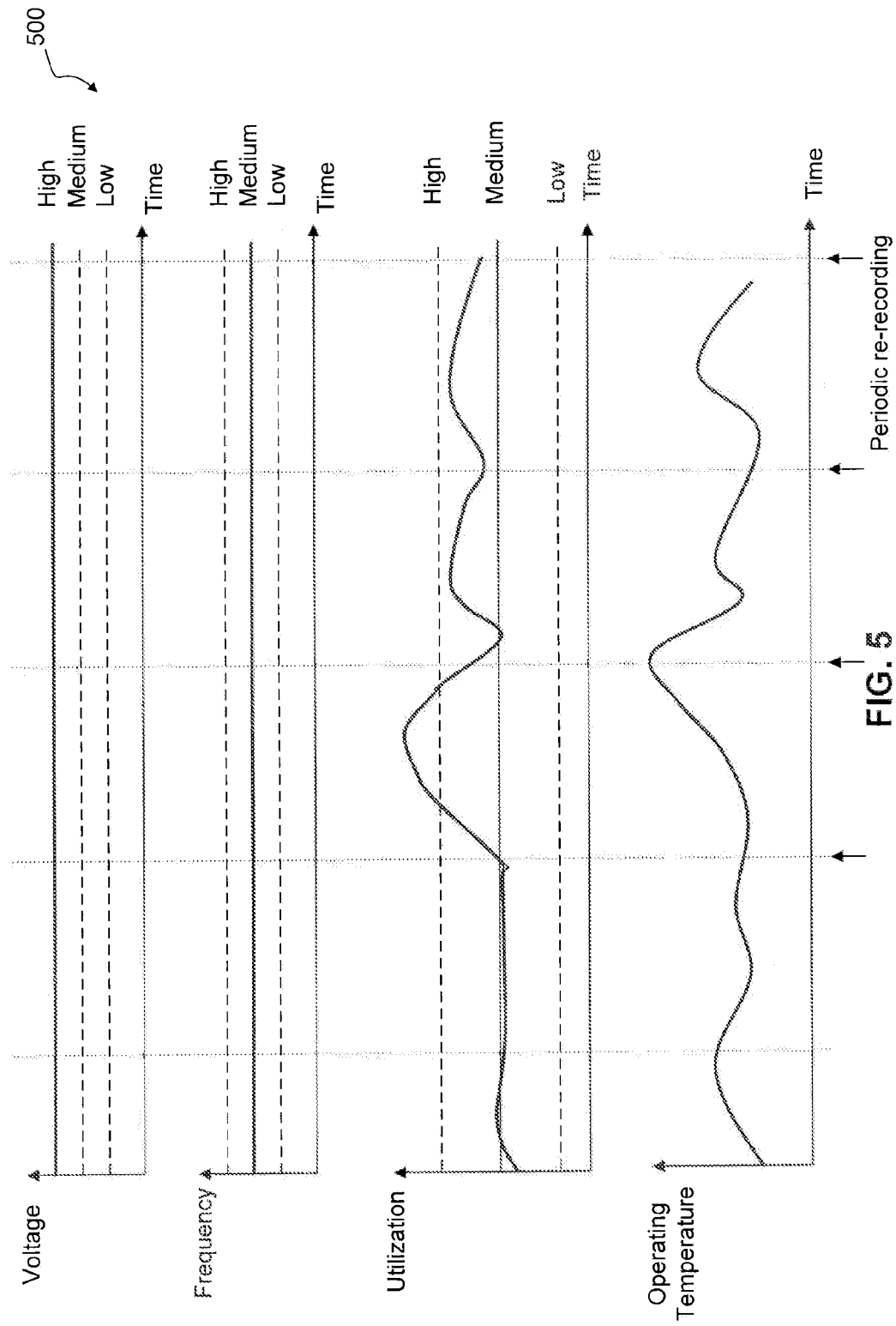
FIG. 5 illustrates exemplary periodic re-recording of the operating temperature according to an embodiment of the present disclosure.

In one embodiment, the output feature unit 112 may re-record the operating temperature of every relevant block periodically. FIG. 5 illustrates the exemplary periodic re-recording of the operating temperature by the output feature unit 112 according to an embodiment of the present disclosure. In particular, FIG. 5 illustrates the periodic re-recording of the operating temperature of an IC block while the IC block is involved in running the application. This period for the above re-recording may be different with respect to different applications and/or with respect to different blocks. For example, the period may be shorter for applications that require IC blocks to function at high frequencies. Further, this period for the above re-recording may be dynamically adjusted to be shorter or longer based on detected input parameter levels. For example, the period for the above re-recording may be dynamically adjusted to be shorter when the input feature unit 111 detects that the IC block is required to dynamically operate at higher frequency or higher utilization while running the application.

In the above manner, the monitoring of the thermal conditions assists in (i) generating an original training table 300 for every IC block to baseline correlations between the input parameters and temperature ranges associated with the output parameters before an application is executed, and (ii) updating the original training table 300, during and after an application is executed, to create an updated training table 400 for every relevant IC block that is involved in running the application. This technique of monitoring the thermal conditions to generate an original training table and to update the original training table based on observed thermal conditions during operation is termed "machine learning." The machine learning technique enables the predictive system 100 to learn the baseline correlations based on observed thermal conditions, and to predict future operating temperatures at which the IC blocks are likely to operate, as discussed below.

II. Predicting Temperature Range Based on Monitored Thermal Conditions

Now, once the updated training table 400 has been generated, the memory controller 105 requests the classification unit 103 to predict an expected temperature range of the IC block for certain instructed input parameter levels. In particular, the memory controller 105 generates instructed input parameter levels, and requests the classification unit 103 to predict a temperature range that is most likely to be expected when the IC block operates under the instructed input parameter levels. The memory controller 105 may generate the instructed input parameter levels based on known requirements of the application that is executed, or based on previously observed input parameter levels at which an IC block was required to operate when the application was executed, and the like. In this manner, the memory controller 105 learns about the input parameter levels that an IC block is more likely to be operated under, and generates the instructed input parameter levels accordingly. Then, the memory controller 105 requests the classification unit 103 to predict an expected temperature range of the IC block under the instructed input parameter levels. The expected temperature range is one of the defined temperature ranges T0-T7. In one embodiment, the memory controller 105 requests the classification unit 103 to predict the expected temperature range only when the new temperature range includes temperatures that are higher than the temperatures included in the original temperature range. For example, the memory controller 105 does not request the classification unit 103 to predict, and the classification unit 103 does not predict, the expected temperature range when the new temperature range includes temperatures that are the same as the temperatures included in the original temperature range.

The classification unit 103 predicts the expected temperature range of the IC block by carrying out a probability calculation in accordance with the instructed input parameter levels. In particular, the classification unit 103 selects, for example, four likely temperature ranges from among the defined operating ranges T0-T7, and then calculates a probability hypothesis for each of the four likely temperature ranges. The calculation yields an expected temperature range that is most likely to be observed under the instructed input parameter levels. The classification unit 103 may select the four likely temperature ranges based on the instructed input parameter levels. For example, the memory controller 105 may generate instructed input parameter levels of high voltage, medium frequency, and high utilization based on known requirements of an application that is executed. In this case, the classification unit 103 selects T3, T4, T5, and T6 as four likely temperature ranges that are likely to be observed under these instructed input parameter levels based on, for example, the correlations included in the updated training table 400. Then, the classification unit 103 proceeds to calculate a probability hypothesis for each of the four likely temperature ranges to predict one temperature range that is most likely to be expected or observed.

The hypothesis calculations are given by Equation 1, which is derived as follows:

$$TL_{Fut} = Prob(y = TL \mid x_1, x_2, \ldots, x_n) \quad \text{Equation 1}$$
$$= \frac{Prob(x_1, x_2, \ldots x_n \mid y = TL) \cdot Prob(y = TL)}{Prob(x_1, x_2, \ldots, x_n)}$$

Therefore, $$TL_{Fut} = prob(T = TL) * \prod_{j=1}^{n} prob(x_j \mid y = TL)$$

where $TL_{Fut}$ represents the probability that an IC block will operate at the temperature range TL (in the future); prob (T=TL) represents the probability of temperature range TL having been observed so far, the record of which is in the updated training table 400; n represents the number of input parameters considered; $x_j$ represents labels (e.g., x1, x2, ..., xn) associated with input parameters; and prob($x_j$|y=TL) represents the probability of observing input parameter $x_j$ and temperature range TL simultaneously, as recorded in the updated training table 400.

The probability calculations will now be discussed by referencing the above example. When the web browsing application is executed, the processor determines, for the arm cluster block (A15) 231, that the new temperature range (T3) is different from the original temperature range (T2). The memory controller 105 then generates instructed input parameter levels of high voltage, medium frequency, and low utilization based on, for example, known requirements of the web browsing application. In this case, the classification unit 103 selects T3, T4, T5, and T6 as four likely temperature ranges that are likely to be observed under the instructed input parameter levels. In one embodiment, the classification unit 103 makes these selections based on the correlations stored in the updated training table 400. Then, the classification unit 103 proceeds to calculate a probability hypothesis for each of the four selected temperature ranges to predict one temperature range that is most likely to be observed. In particular, the classification unit 103 calculates the probability hypothesis for each of the four selected temperature ranges, and predicts that the temperature range having the highest probability is the one that is most likely to be observed. To calculate the respective probabilities, the classification unit 103 refers to the updated training table 400, as discussed below.

Temperature Range T4

The classification unit 103 calculates the probability that the arm cluster block (A15) 231 will operate at the temperature range of T4 (i.e., that the temperature range T4 will be observed) when the web browsing application is executed. Based on the above Equation 1, this probability is given by $$T4_{Fut} = prob(T = T4) * \prod_{j=1}^{3} prob(x_j \mid y = T4)$$

Therefore, $$T4_{Fut} = prob(T4) * prob(x1 = high, x2 = medium, x3 = low \mid y = T4)$$

where $T4_{Fut}$ represents the probability that the arm cluster block (A15) 231 will operate at the temperature range T4 under the input parameters of high voltage, medium frequency, and low utilization; prob(T4) represents the probability of temperature range T4 having been observed so far, the record of which is in the updated training table 400; x1, x2, and x3 represent labels associated with input parameters voltage, frequency, and utilization, respectively; and prob(x1=high, x2=medium, x3=low|y=T4) represents the product of probabilities of (i) observing high voltage and temperature range T4 simultaneously, (ii) observing medium frequency and temperature range T4 simultaneously, and (iii) observing low utilization and temperature range T4 simultaneously, as seen in the updated table 400.

Now, prob(T4) is calculated based on the fact that the temperature range of T4 was observed a total of five (5) times among the twenty-eight (28) correlations that are currently listed in the updated training table 400 (e.g., in rows 13, 14, 16, 19, and 20). Therefore, prob(T4)=5/28. As discussed above, prob(x1=high, x2=medium, x3=low y=T4)=prob(x1=high|y=T4)*prob(x2=medium|y=T4)*prob(x3=low|y=T4). Further, prob(x1=high|y=T4) is the probability of observing high voltage and temperature range T4 simultaneously, the record of which is in the updated table 400. From the updated training table 400, we see that high voltage is simultaneously observed with T4 two (2) times out of the five (5) times when T4 is observed in total (e.g., in rows 19 and 20). Therefore, prob(x1=high|y=T4)=2/5. Similarly, prob(x2=medium|y=T4) is the probability of observing medium frequency and temperature range T4 simultaneously. From the updated training table 400, we see that medium frequency is simultaneously observed with T4 two (2) times out of the five (5) times when T4 is observed in total (e.g., in rows 13 and 14). Therefore, prob(x2=medium|y=T4)=2/5. Finally, prob(x3=low|y=T4) is the probability of observing low utilization and temperature range T4 simultaneously. From the updated training table 400, we see that low utilization is simultaneously observed with T4 three (3) times out of the five (5) times when T4 is observed in total (e.g., in rows 13, 16, and 19). Therefore, prob(x3=low|y=T4)=3/5.

Therefore, based on the above calculations, T4 is given by $$T4_{Fut}=5/28*2/5*2/5*3/5=0.0171$$

Similar to the above calculations for $T4_{Fut}$, the classification unit 103 calculates $T3_{Fut}$, $T5_{Fut}$, and $T6_{Fut}$ for the respective temperature ranges, and they are given by Temperature Range T6

$$T6_{Fut}=prob(T6)*prob(x1=high,x2=medium, x3=low|y=T6)$$

Therefore, $T6_{Fut}=3/28*3/3*1/3*2/3=0.0192$

Temperature Range T5

$$T5_{Fut}=prob(T5)*prob(x1=high,x2=medium, x3=low|y=T5)$$

Therefore, $T5_{Fut}=prob(T5)*prob(x1=high|y=T5)*prob(x2=medium|y=T5)*prob(x3=low|y=T5)=3/28*0/3*1/3*0/3=0$.

Now, from the updated training table 400, we see that high voltage has not yet been observed simultaneously with temperature range T5, and also that low utilization has not yet been observed simultaneously with temperature range T5. As such, the data for the above two instances is "missing." Therefore, the above calculation yields a probability of zero (0) for $T5_{Fut}$. In such instances, the present disclosure contemplates calculating the probability for prob(x1=high|y=T5) and prob(x3=low|y=T5) using the following general equation.

$$prob(x_j|y=TL)=\lambda/[freq(y=TL)+(\lambda*m)] \quad \text{Equation 2}$$

where $\lambda$ is a smoothing constant having an integer value greater than zero (0); freq(y=TL) is the frequency (i.e., number of times) the temperature range of TL was observed in total, the record of which is in the updated training table 400; and m is the number of different input parameter levels observed when the temperature range of TL was observed in total.

Therefore, filling in the above values for prob(x1=high|y=T5), we get $$prob(x1=high|y=T5)=\lambda/[freq(y=T5)+(\lambda*m)]=1/[3+(1*2)]=1/5,$$

where $\lambda$ is assumed to be 1, freq(y=T5)=3 because the temperature range of T5 was observed three (3) times in total (e.g., in rows 15, 17, and 18 of the updated table 400), and m=2 because the two (2) different input parameter levels of "high" and "medium" were observed when the temperature range of T5 was observed.

Similarly, filling in the above values for prob(x3=low|y=T5), we get $$prob(x3=low|y=T5)=\lambda/[freq(y=T5)+(\lambda*m)]=1/[3+(1*3)]=1/6,$$

where $\lambda$ is assumed to be 1, freq(y=T5)=3 because the temperature range of T5 was observed three (3) times in total (e.g., in rows 15, 17, and 18 of updated table 400), and m=3 because three different input parameter levels of "high," "medium," and "low" are observed when the temperature range of T5 was observed.

Finally, plugging in the above values for the calculation of $T5_{Fut}$, we get $$T5_{Fut}=prob(T5)*prob(x1=high|y=T5)*prob(x2=medium|y=T5)*prob(x3=low|y=T5)=3/28*1/5*1/3*1/6=0.0011$$

Temperature Range T7

$$T7_{Fut}=prob(T7)*prob(x1=high,x2=medium, x3=low|y=T7)$$

Therefore, $T7_{Fut}=prob(T7)*prob(x1=high|y=T7)*prob(x2=medium|y=T7)*prob(x3=low|y=T7)=4/28*4/4*2/4*0/4=0$. Now, applying the above Equation 2 to prob(x3=low|y=T7), we get $$prob(x3=low|y=T7)=\lambda/[freq(y=T7)+(\lambda*m)]=1/[4+(1*2)]=1/6,$$

where $\lambda$ is assumed to be 1, freq(y=T7)=4 because the temperature range of T7 was observed four (4) times in total (e.g., in rows 23, 24, 26, and 27 of the updated table 400), and m=2 because the two (2) different input parameter levels of "high" and "medium" were observed when the temperature range of T7 was observed. Plugging the above value in the equation for $T7_{Fut}$, we get $$T7_{Fut}=prob(T7)*prob(x1=high|y=T7)*prob(x2=medium|y=T7)*prob(x3=low|y=T7)=4/28*4/4*2/4*1/6=0.0119$$

Therefore, based on the above hypothesis calculations, $$T4_{Fut}=0.0171$$

$$T6_{Fut}=0.0192$$

$$T5_{Fut}=0.0011$$

$$T7_{Fut}=0.0119$$

Now, the classification unit 103 predicts the temperature range having the highest probability as the expected temperature range, which is the one that is most likely to be observed under the instructed input parameter levels. Based on the above example, temperature range T6 has the highest probability among the four selected temperature ranges, and therefore the classification unit 103 predicts and reports that temperature range T6 is the expected temperature range, which most likely to be observed under the instructed input parameter levels.

III. Dynamically Scaling the Input Parameters

Finally, the thermal control unit 104 dynamically scales (or adjusts), in real-time, the input parameter levels based on the predicted temperature range to control the operating temperature of an IC block, as discussed below. For example, in real-time, when an application is running and the IC block operates under the instructed input parameter levels, the thermal control unit 104 communicates with the output feature unit 112 (via memory controller 105) to monitor the operating temperature of the IC block. For example, the thermal control unit 104 monitors the periodically recorded operating temperatures of the IC block. Further, the thermal control unit 104 compares these recorded operating temperatures of the IC block with the expected temperature range that was reported by the classification unit 103. Based on the results of the comparisons, the thermal control unit 104 dynamically scales one or more input parameter levels as follows.

When these recorded operating temperatures of the IC block are within the expected temperature range that was reported by the classification unit 103, the thermal control unit 104 maintains the current input parameter levels at which the IC block is operating. However, when a periodically recorded operating temperature of the IC block is within a temperature range having higher temperatures than the expected temperature range, then the thermal control unit 104 dynamically lowers at least one input parameter level such that the operating temperature of the IC block is reduced. For example, the thermal control unit 104 may dynamically lower the operating voltage and/or the operating frequency to reduce the operating temperature of the IC block. This allows the operating temperature of the IC block to fall within the expected temperature range. Finally, when a periodically recorded operating temperature of the IC block is within a temperature range having lower temperatures than the expected temperature range, then the thermal control unit 104 dynamically increases at least one input parameter level such that the operating temperature of the IC block may rise to be within the expected temperature range. For example, the thermal control unit 104 may increase the utilization of the IC block to allow the IC block to complete a task sooner. In one embodiment, once the operating temperature of the IC block has risen to be within the expected temperature range and the task has been completed, the thermal control unit 104 may allow the IC block to enter an idle mode to lower or to stabilize the operating temperature of the IC block.

In the above manner, the thermal control unit 104 dynamically scales the input parameter levels based on the expected temperature range to control the operating temperature of the IC block in real-time. The dynamic scaling of the input parameter levels to control the operating temperatures of the IC blocks allows the predictive system 100 to maximize performance of integrated circuits 200 packaged in a POP solution while satisfying the thermal safety and performance conditions of the other integrated circuits 200 in the POP solution.

Figure 6:
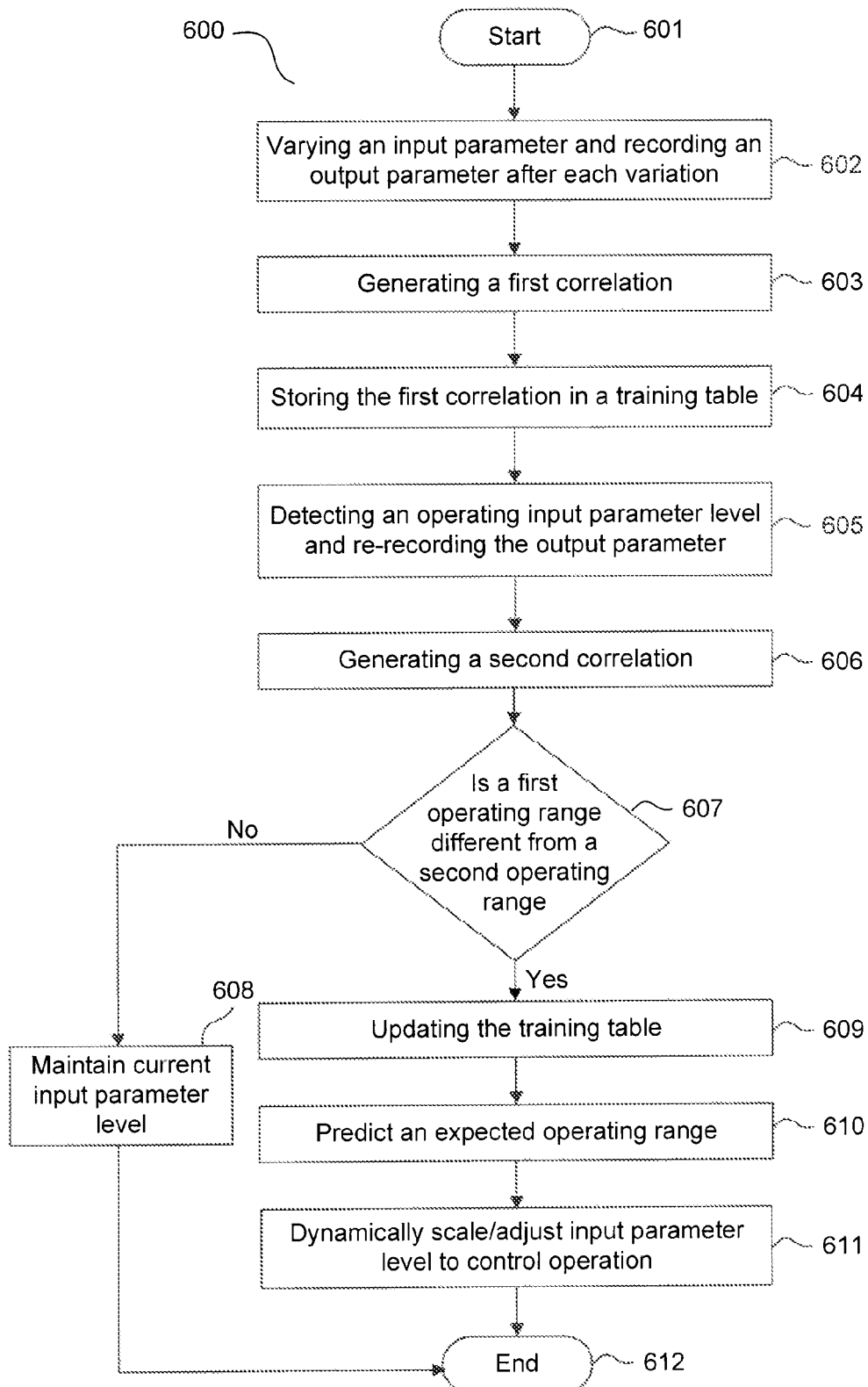
FIG. 6 illustrates an exemplary process performed by the predictive system according to an embodiment of the present disclosure.

FIG. 6 illustrates an exemplary process 600 performed by the above predictive system according to an embodiment of the present disclosure. The method starts at step 601. At step 602, before an application is executed, a level of each input parameter of an IC block is incrementally varied by the input feature unit 111, and a respective operating temperature of the IC block is recorded at the varied levels or after each incremental variation by the output feature unit 112. At step 603, first correlations between the various (e.g., all possible) levels of each input parameter and respective first operating temperature ranges (e.g., range T0-T7) associated with the recorded operating temperatures are generated by the training unit 102. At step 604, the first correlations are stored in the original training table 300. At step 605, during and/or after an application is executed, the operating input parameter levels are detected by the input feature unit 111, and corresponding operating temperatures at the detected input parameter levels are re-recorded by the output feature unit 112. In one embodiment, the corresponding operating temperatures are re-recorded by the output feature unit 112 periodically. At step 606, a second correlation between the detected input parameter levels and a second operating temperature range associated with the re-recorded corresponding operating temperatures is generated by the training unit 102. At step 607, it is determined whether the second operating temperature range is different from the first operating temperature range, which correlates to input parameter levels that are similar or identical to the detected input parameter levels. For example, it is determined whether the second operating temperature range T7 is different from the first operating temperature range T6, which correlates to the input parameter levels of row 22 that are similar or identical to the detected input parameter levels of row 28. When it is determined that the first operating temperature range is the same as the second operating temperature range, then at step 608, the current input parameter levels are maintained by the thermal control unit 104. However, when it is determined that the first operating temperature range is different from the second operating temperature range, then at step 609, the original training table 300 is updated by the training unit 102. Then, at step 610, an expected operating temperature range of the IC block is predicted by the classification unit 103. Based on the expected operating temperature range, at step 611, one or more relevant input parameter levels are dynamically scaled or adjusted by the thermal control unit 104 to control operation of the IC block. The process ends at step 612.

Figure 7:
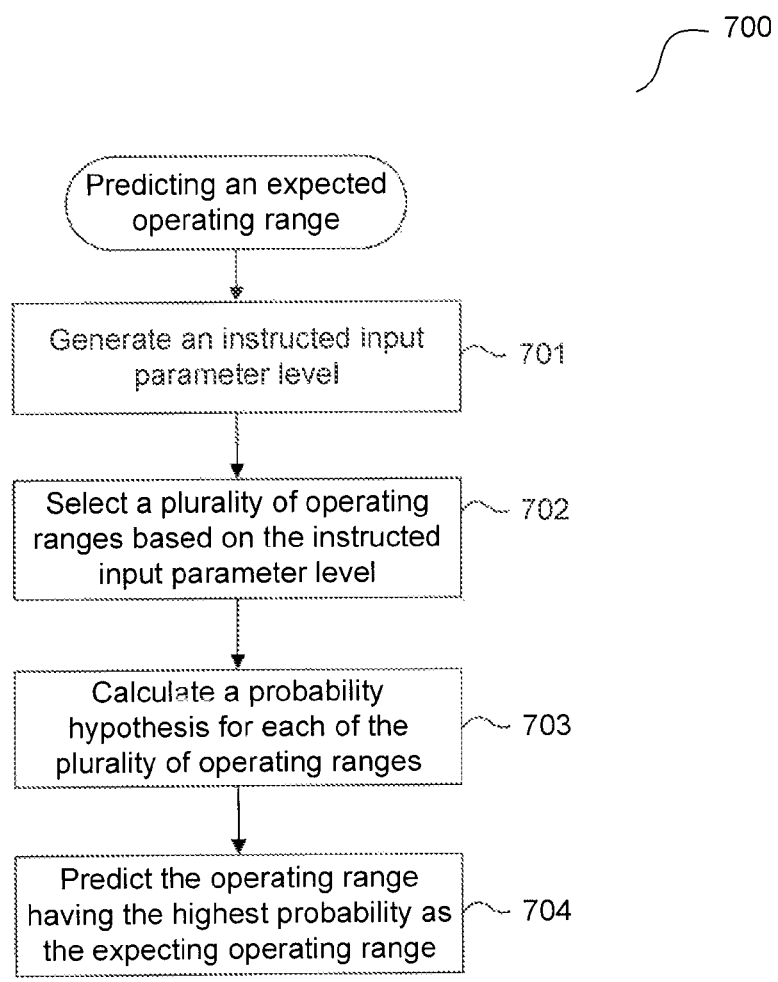
FIG. 7 illustrates exemplary steps performed in predicting the expected operating temperature range according to an embodiment of the present disclosure.

FIG. 7 illustrates exemplary steps 700 performed in predicting the expected operating temperature range, as discussed above in step 610, according to an embodiment of the present disclosure. At step 701, instructed input parameter levels are generated by the memory controller 105, and an expected operating temperature range is requested to be predicted. In one embodiment, the instructed input parameter levels maybe generated based on known requirements of the application that is executed, or based on previously observed input parameter levels at which the IC block was required to operate when an application was previously executed, and the like. At step 702, a plurality of operating temperature ranges (e.g., from among T0-T7) are selected by the classification unit 103 as being more likely to be observed based on the instructed input parameter levels. At step 703, a probability hypothesis for each of the selected plurality of operating temperature ranges is calculated by the classification unit 103. At step 704, the range having the highest probability is predicted by the classification unit 103 to be the expected temperature range, thereby indicating that the IC block is most likely to operate at the expected temperature range under the instructed input parameter levels.

Figure 8:
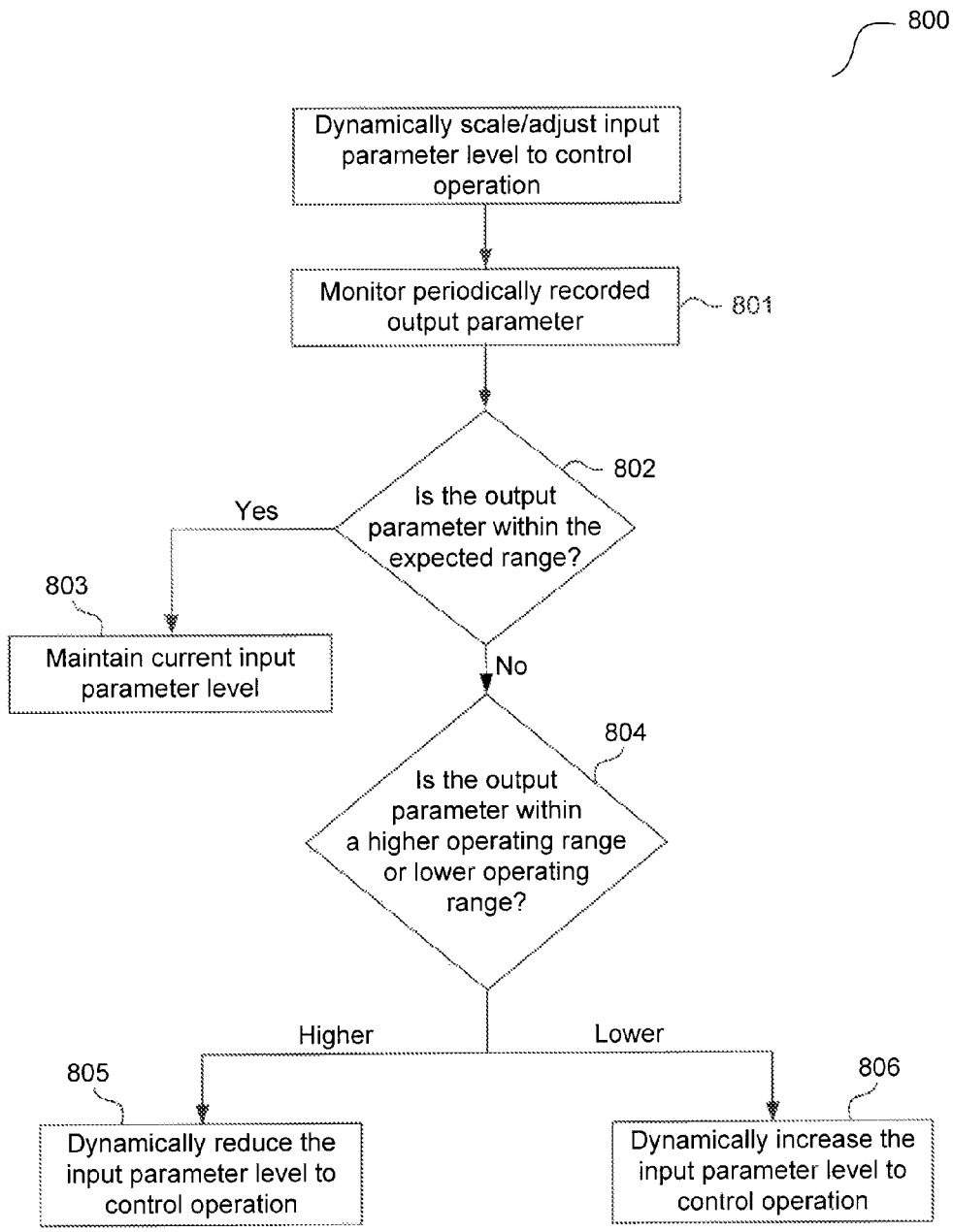
FIG. 8 illustrates exemplary steps performed in dynamically scaling/adjusting one or more input parameter levels according to an embodiment of the present disclosure.

FIG. 8 illustrates exemplary steps 800 performed in dynamically scaling/adjusting the one or more input parameter levels to control operation of the IC block, as discussed above in step 611, according to an embodiment of the present disclosure. At step 801, the periodically recorded operating temperatures are monitored by the thermal control unit 104. At step 802, it is determined whether a recorded operating temperature is within the expected temperature range reported by the classification unit 103. When it is determined that the recorded operating temperature is within the expected temperature range, then at step 803, the current input parameter levels may be maintained by the thermal control unit 104. However, when it is determined that the recorded operating temperature is not within the expected temperature range, then at step 804, it is determined whether the recorded operating temperature is within a temperature range having higher temperatures than the expected temperature range or within a temperature range having lower temperatures than the expected temperature range. When it is determined that the recorded operating temperature is within a temperature range having higher temperatures than the expected temperature range, then at step 805, at least one input parameter level may be dynamically reduced by the thermal control unit 104 in real-time to control the operating temperature of the IC block. In one embodiment, at least one input parameter level is dynamically reduced by the thermal control unit 104 to decrease a device temperature of the IC block. Alternatively, when it is determined that the recorded operating temperature is within a temperature range having lower temperatures than the expected temperature range, then at step 806, at least one input parameter level may be increased to allow the operating temperature of the IC block to rise and be within the expected temperature range, as discussed above.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:
1. A method for use in an integrated circuit (IC), comprising:
before executing an application associated with an IC block, incrementally varying levels of an input parameter of the IC block and recording respective output temperatures of the IC block at the varied levels;
storing, in a training table, first correlations between the varied levels of the input parameter and defined temperature ranges corresponding to the respective output temperatures;
while the application associated with the IC block is being executed, detecting a level of the input parameter associated with operation of the IC block and re-recording the respective output temperature at the detected level;
generating a second correlation between the detected level and a second temperature range corresponding to the re-recorded output temperature;
determining whether the second temperature range is different from a first temperature range from among the defined temperature ranges, the first temperature range correlating to the level of the input parameter that is similar to the detected level;
updating the training table including adding the second correlation to the training table when the second temperature range is different from the first temperature range;
calculating, based on the updated training table, a plurality of probabilities corresponding to a plurality of likely temperature ranges for the IC block;
predicting, based on the plurality of probabilities, an expected temperature range at which the IC block is expected to operate; and
dynamically scaling, based on the expected temperature range, the detected level of the input parameter to control the output temperature of the IC block.

2. The method according to claim 1, wherein the updating includes adding the second correlation to the training table only when temperatures included in the second temperature range are higher than temperatures included in the first temperature range.

3. The method according to claim 1, further comprising:
generating an instructed input parameter level based on known requirements associated with running the application; and
selecting, based on the instructed input parameter level, the plurality of likely temperature ranges from among the defined temperature ranges, wherein the expected temperature range is a temperature range from among the plurality of likely temperature ranges corresponding to a highest probability in the plurality of probabilities.

4. The method according to claim 3, wherein the calculating includes calculating the probability using the equation:

$$TL_{Fut} = prob(T = TL) * \prod_{j=1}^{n} prob(x_j \mid y = TL)$$

wherein:
$TL_{Fut}$ represents a probability that the IC block will operate at temperature range TL,
prob(T=TL) represents a probability of observing the temperature range TL,
n represents a number of input parameters; $x_j$ represents a label associated with the input parameters, and
prob($x_j$|y=TL) represents a probability of observing input parameter $x_j$ and temperature range TL simultaneously.

5. The method according to claim 1, wherein the calculating includes calculating the probability using the equation:

$$TL_{Fut} = prob(T = TL) * \prod_{j=1}^{n} prob(x_j \mid y = TL)$$

wherein:
- $TL_{Fut}$ represents a probability that the IC block will operate at temperature range TL,
- prob(T=TL) represents a probability of observing the temperature range TL; n represents a number of input parameters,
- $x_j$ represents a label associated with the input parameters, and
- prob($x_j$|y=TL) represents a probability of observing input parameter $x_j$ and temperature range TL simultaneously.

6. The method according to claim 4, wherein when data associated with the prob($x_j$|y=TL) is unavailable, the calculating includes calculating the prob($x_j$|y=TL) using the equation:

prob($x_j$|y=TL)=λ/[freq(y=TL)+(λ*m)]

wherein:
- λ represents a smoothing constant having an integer value greater than zero,
- freq(y=TL) represents a total number of times the temperature range TL was observed, and
- m represents a number of different input parameter levels observed with respect to the temperature range TL.

7. The method according to claim 5, wherein when data associated with the prob($x_j$|y=TL) is unavailable, the calculating includes calculating the prob($x_j$|y=TL) using the equation:

prob($x_j$|y=TL)=λ/[freq(y=TL)+(λ*m)]

wherein:
- λ represents a smoothing constant having an integer value greater than zero,
- freq(y=TL) represents a total number of times the temperature range TL was observed, and
- m represents a number of different input parameter levels observed with respect to the temperature range TL.

8. The method according to claim 1, wherein the re-rerecording the output temperature includes periodically re-rerecording the output temperature while running the application associated with the IC block.

9. The method according to claim 8, wherein the periodically re-recording includes dynamically adjusting, based on the detected level, a period associated with the periodically re-recording the output temperature.

10. An integrated circuit (IC), comprising:
a processor configured to:
- before executing an application associated with an IC block, vary a level of an input parameter of the IC block,
- record respective output temperatures of the IC block at the varied levels,
- store, in a training table, first correlations between the varied levels of the input parameter and defined temperature ranges corresponding to the respective output temperatures,
- while the application associated with the IC block is being executed, detect a level of the input parameter associated with operation of the IC block and re-record the output temperature at the detected level,
- determine whether a second temperature range associated with the re-recorded output temperature is different from a first temperature range from among the defined temperature ranges, the first temperature range correlating to the level of the input parameter that is similar to the detected level,
- update the training table including adding a second correlation between the detected level and the second temperature range to the training table when the second temperature range is different from the first temperature range,
- calculate, based on the updated training table, a plurality of probabilities corresponding to a plurality of likely temperature ranges for the IC block, and
- predict, based on the plurality of probabilities, an expected temperature range at which the IC block is expected to operate.

11. The IC according to claim 10, wherein the processor is configured to add the second correlation to the training table only when temperatures included in the second temperature range are higher than temperatures included in the first temperature range.

12. The IC according to claim 10, wherein the processor is further configured to:
- generate an instructed parameter level based on known requirements associated with running the application, and
- select, based on the instructed input parameter level, the plurality of likely temperature ranges from among the defined temperature ranges, wherein the expected temperature range is a temperature range from among the plurality of likely temperature ranges corresponding to a highest probability in the plurality of probabilities.

13. The IC according to claim 12, wherein the processor is configured to calculate the probability using the equation:

$$TL_{Fut} = prob(T = TL) * \prod_{j=1}^{n} prob(x_j \mid y = TL)$$

wherein:
- $TL_{Fut}$ represents a probability that the IC block will operate at temperature range TL,
- prob(T=TL) represents a probability of observing the temperature range TL,
- n represents a number of input parameters; $x_j$ represents a label associated with the input parameters, and
- prob($x_j$|y=TL) represents a probability of observing input parameter $x_j$ and temperature range TL simultaneously.

14. The IC according to claim 10, wherein the processor is configured to calculate the probability using the equation:

$$TL_{Fut} = prob(T = TL) * \prod_{j=1}^{n} prob(x_j \mid y = TL)$$

wherein:
- $TL_{Fut}$ represents a probability that the IC block will operate at temperature range TL,
- prob(T=TL) represents a probability of observing the temperature range TL; n represents a number of input parameters, $x_j$ represents a label associated with the input parameters, and prob($x_j$|y=TL) represents a probability of observing input parameter $x_j$ and temperature range TL simultaneously.

15. The IC according to claim 13, wherein when data associated with the prob($x_j$|y=TL) is unavailable, the processor is configured to calculate the prob($x_j$|y=TL) using the equation:

$$prob(xj|y=TL)=\lambda/[freq(y=TL)+(\lambda*m)]$$

wherein:
$\lambda$ represents a smoothing constant having an integer value greater than zero,
freq(y=TL) represents a total number of times the temperature range TL was observed, and
m represents a number of different input parameter levels observed with respect to the temperature range TL.

16. The IC according to claim 10, wherein the processor is further configured to periodically re-record the output temperature while running the application associated with the IC block.

17. The IC according to claim 16, wherein the processor is further configured to dynamically adjust, based on the detected level, a period associated with the periodically re-recording the output temperature.

18. A method for use in an integrated circuit (IC), comprising:

incrementally varying levels of an input parameter of an IC block and recording respective output temperatures of the IC block at the varied levels;

storing, in a training table, first correlations between the varied levels of the input parameter and defined temperature ranges corresponding to the respective output temperatures;

updating the training table including adding a second correlation that is generated based on detecting a level of the input parameter associated with operation of the IC block and on re-recording the output temperature at the detected level;

calculating, based on the updated training table, a plurality of probabilities corresponding to a plurality of likely temperature ranges for the IC block;

predicting, based on the plurality of probabilities, an expected temperature range at which the IC block is expected to operate, the predicting including calculating a probability associated with the expected temperature range.

19. The method of claim 18, further comprising:
determining the plurality of likely temperature ranges based on known requirements associated with the application.

20. The method of claim 18, further comprising:
predicting a temperature range from among the plurality of likely temperature ranges that has the highest probability as the expected temperature range.

* * * * *